United States Patent
Tajima et al.

(10) Patent No.: US 7,240,919 B2
(45) Date of Patent: Jul. 10, 2007

(54) VEHICULAR SHOCK ABSORBING BODY

(75) Inventors: Hiroyuki Tajima, Aichi-ken (JP); Takahiko Sato, Aichi-ken (JP); Osamu Fukawatase, Aichi-ken (JP); Takeaki Kato, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 253 days.

(21) Appl. No.: 10/988,841

(22) Filed: Nov. 16, 2004

(65) Prior Publication Data
US 2005/0116456 A1  Jun. 2, 2005

(30) Foreign Application Priority Data
Nov. 21, 2003  (JP)  ............................. 2003-392730

(51) Int. Cl.
*B60R 21/045* (2006.01)
(52) U.S. Cl. ........................... 280/751; 280/752
(58) Field of Classification Search .............. 280/751, 280/752; 296/70
See application file for complete search history.

(56) References Cited

U.S. PATENT DOCUMENTS 5,131,681 A  7/1992  Wetzel et al.

FOREIGN PATENT DOCUMENTS

| JP | A-4-278858 | 10/1992 |
| JP | A-8-91160 | 4/1996 |
| JP | A-8-142234 | 6/1996 |
| JP | A-2001-122061 | 5/2001 |

*Primary Examiner*—Faye M. Fleming
(74) *Attorney, Agent, or Firm*—Posz Law Group, PLC

(57) ABSTRACT

The invention provides a vehicular shock absorbing body which absorbs a shock by a grid-like rib formed on a support plate portion and can inhibit a load point at an initial stage and a terminal stage, in a load—displacement (F-S) curve of the vehicular shock absorbing body. A shock absorbing body (40) used for absorbing a shock in a vehicle and made of a synthetic resin, is provided with a support plate portion (42), and a shock absorbing portion (45) formed in a grid shape on the support plate portion (42) by a plurality of thin ribs (44, 44), and plastically deforming at a time of applying a shock load so as to be absorbable a shock energy. A notch (a leading end side notch) 48 is formed between grid crossing points (46) in the thin rib (44) from a leading end side, and a notch (a root side notch) 50 is formed from a root side of the grid crossing points (46) so as to include the support plate portion (42), thereby inhibiting a load point from being generated at an initial stage and a terminal stage in the F-S curve.

5 Claims, 5 Drawing Sheets

VEHICULAR SHOCK ABSORBING BODY

BACKGROUND OF THE INVENTION

1. Field of the Invention

The present invention relates to a vehicular shock absorbing body, and more particular to a vehicle shock absorbing body which tends to inhibit an excessive load from being generated in a knee or the like at a time when a body member having a small pressure receiving area such as the knee or the like is interfered with an interior member in the case that a shock is applied to a vehicle.

A description will be given below of a vehicular shock absorbing body by exemplifying a case that the vehicle shock absorbing body is assembled in a back surface of a restraint body in a passenger protecting apparatus (a passenger restraint apparatus) which protrudes toward a restraint predetermined position (for example, the knee) of a seated passenger so as to inhibit the restraint predetermined position from moving in collision of the vehicle, however, the structure is not limited to this.

In other words, the vehicular shock absorbing body can be applied to a case that no passenger restraint mechanism is provided, and a vehicular shock absorbing body is simply arranged in a back surface of a vehicle interior member such as a side door, a quarter panel, a front/back seat or the like so as to reduce a shock load and a shock energy.

2. Description of Related Art

In conventional, as this kind of passenger restraint apparatus, there has been a structure in which a knee restraint body (a restraint panel) such as a knee bolster, a knee panel or the like connected to a drive mechanism is arranged so as to face the knee of the seated passenger in such a manner that a front face of the knee restraint body forms a part of the interior member (for example, Japanese Unexamined Patent Publication Nos. 4-278858 and 2001-122061).

At this time, in the case that the knee restraint panel is interfered with the knee, it is desirable to arrange the shock absorbing body in the back surface of the knee restraint panel in view of reducing the shock load and/or the shock energy received by the knee.

There can be considered that the shock absorbing body employs a vehicular shock absorbing structure (a vehicular shock absorbing body) having a synthetic resin rib structure (Japanese Unexamined Patent Publication Nos. 8-142234 and 8-91160). Japanese Unexamined Patent Publication No. 8-142234 describes a structure in which thin ribs having a predetermined height are provided in a rising grid-like manner on one surface of a support plate portion (a top plate), and the patent document 4 describes a structure in which a part of the ribs or all of the ribs are formed such that at least an upper portion of the rib is gradually narrowed toward an upper end in the structure described in the patent document 3.

SUMMARY OF THE INVENTION

However, it has been known that in the vehicular shock absorbing body in the structure described in the patent document 3 mentioned above, a protrusion (a point) tends to be generated in an initial load value (a buckling load) and a terminal load (a bottom load) value in a load (F)—displacement (stroke: S) curve (hereinafter, refer to "F-S curve") in the shock absorbing body, at a time when the load is applied from a leading end side via a wall surface of the interior member such as a restraint panel or the like (refer to FIG. 5(B)).

Further, in the vehicular shock absorbing body in the structure described in the patent document 4, the point of the initial value becomes smaller, however, the point tends to be generated in the terminal load value, in the F-S curve in the same manner.

The load point at the shock absorbing initial stage is generated before starting a partly bucking deformation of the rib because the load is received by the knee via the restraint panel from an entire surface of the grid rib. Further, the load point at the shock absorbing terminal stage is generated in the case that the knee makes an intrusion into a portion near a root portion of the grid rib because a lot of collapse leaving ribs exist in a bottom portion in the case that the buckling deformation of the rib reaches the portion near the bottom.

It is desirable that the load point at the initial stage and the terminal stage in the F-S curve of the shock absorbing body is as small as possible. It is because the load point generates a maximum applied load value to the knee.

In order to inhibit the initial point in the F-S curve, it can be considered that a deformation load (a deformation resisting force) in the leading end side of the thin rib is made smaller. However, if the deformation load is small, an energy absorbing amount becomes small, and it is necessary to make a deforming amount (stroke) of the shock absorbing body relatively long, so that the shock absorbing body becomes thick (large-sized).

On the other hand, in order to inhibit the terminal point in the same manner, it is necessary that the absorption of the shock energy is completed before the knee makes an intrusion into the portion near the root portion of the grid rib. Accordingly, it is necessary to make the deforming amount (stroke) of the shock absorbing body relatively long in the same manner as mentioned above, so that the shock absorbing body becomes thick (large-sized).

The present invention is made by taking the above matters into consideration, and an object of the present invention is to provide a vehicular shock absorbing body which absorbs a shock by a grid-like rib formed on a support plate portion and can inhibit a load point at an initial stage and a terminal stage, in F-S curve of the vehicular shock absorbing body.

The vehicular shock absorbing body according to the present invention can achieve the object mentioned above by the structure as follow. According to the present invention, there is provided a shock absorbing body used for absorbing a shock in a vehicle and made of a synthetic resin, comprising:

a support plate portion; and a shock absorbing portion formed in a grid shape on the support plate portion by a plurality of thin ribs, and plastically deforming at a time of applying a shock load so as to be absorbable a shock energy, wherein an entire cross sectional area of each of a leading end portion corresponding to a shock absorbing initial portion and a root portion corresponding to a shock absorbing terminal portion in the thin ribs is made smaller than an intermediate portion, and a load point is inhibited from being generated at an initial stage and a terminal stage in load (F)—displacement amount (S).

Since the initial deformation load before the buckling of the thin rib is generated in the shock absorbing portion is lowered by making a cross sectional area parallel to the shock load applied surface of the initial applied portion and the terminal applied portion of the shock load small, and the amount of the portion which is not collapsed is relatively reduced even near the bottom, the load point (peak) at the initial and terminal stages is small or lost (inhibited).

Generally, in the structure mentioned above, a notch is formed between grid crossing points in the thin rib from a leading end side, and a notch is formed from a root side of the grid crossing points so as to include a support plate portion, thereby inhibiting the load point from being generated at the initial stage and the terminal stage in the load (F)—displacement amount (S).

The deformation load (the deformation resisting force) in the leading end side of the thin rib becomes smaller compared with the intermediate portion of the thin rib by forming the notch between the grid crossing portions. Accordingly, even if the load is applied to the knee via the restraint panel from the entire surface of the grid rib, the initial load point of the F-S curve is inhibited.

Further, even if the knee makes an intrusion into the portion close to the root portion of the grid rib, the notch exists in the root side of the grid crossing point including the support plate portion, so that the portion which is not collapsed of the buckling deformation in the rib is absorbed by the notch. Accordingly, even if the knee comes to the portion near the bottom, the initial load point of the F-S curve can be inhibited.

Further, in the case of the structure mentioned above, since the notch is formed from both the surfaces of the shock absorbing body, the shock absorbing body can be easily (injection) molded.

The grid shape is normally formed in a rectangular shape. It becomes easy to design a shock absorbing property.

Further, the vehicular shock absorbing body in accordance with each of the structures is used by being arranged in the back surface of the protection predetermined portion of the vehicular interior member provided with the protection predetermined portion with respect to the passenger.

It is desirable that the protection predetermined portion is constituted by a restrain panel protruding to the passenger side at a time of applying the shock load so as to restrain and protect the knee of the passenger because an effect of the present invention can be significantly obtained.

DESCRIPTION OF THE PREFERRED EMBODIMENTS

A description will be given below of an embodiment in accordance with the present invention with reference to an illustrated example.

Figure 1:
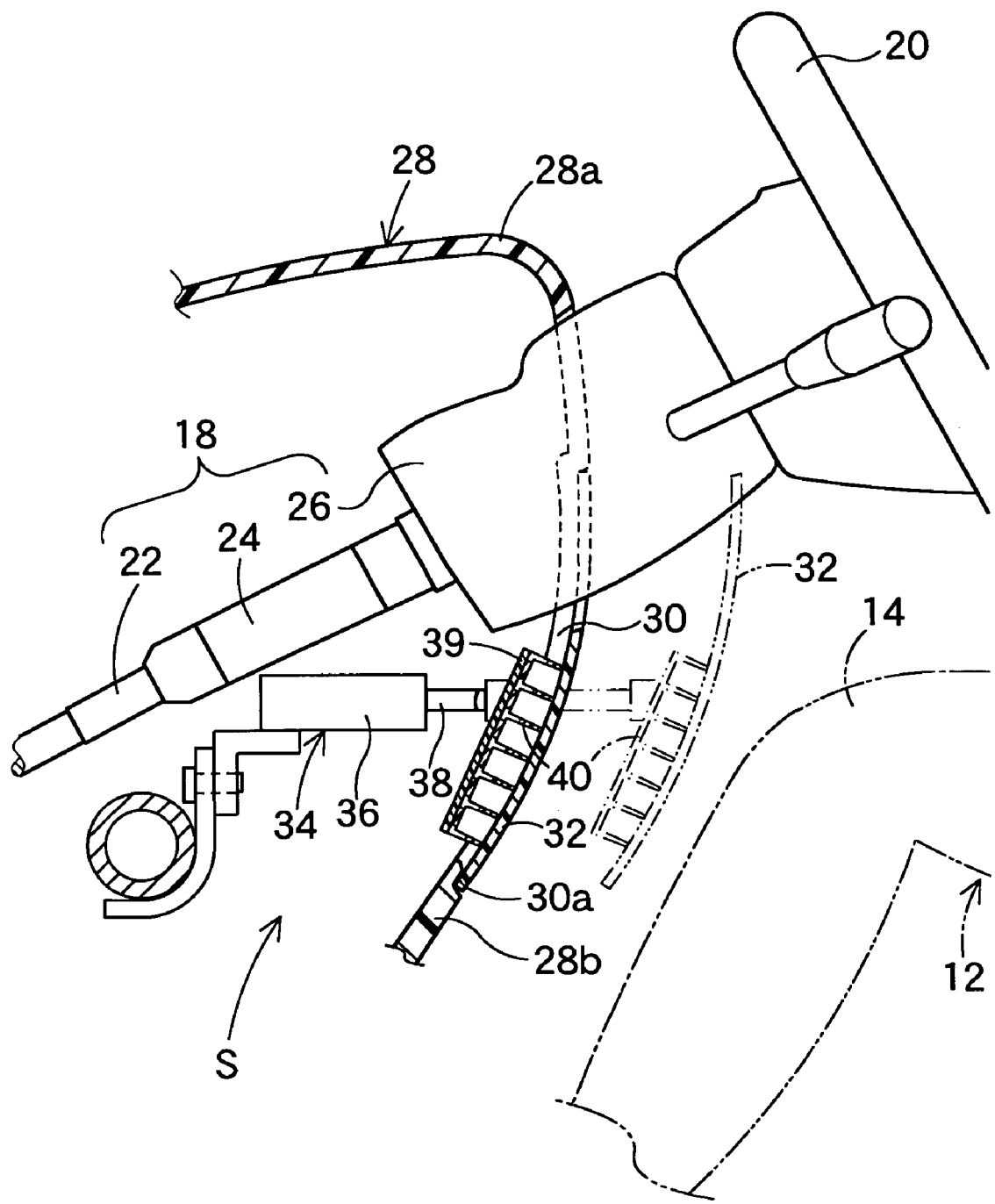
FIG. 1 is a schematic cross sectional view of a portion in which a passenger restraint apparatus corresponding to one applied example of a shock absorbing body in accordance with the present invention is assembled.

FIG. 1 shows an example of a passenger protecting apparatus (a passenger restraint apparatus) to which a shock absorbing body in accordance with the present embodiment is mounted.

The passenger restraint apparatus S is structured, as shown in FIG. 1, such that a knee 14 of a driver (a passenger) 12 corresponding to the passenger is set to a restraint predetermined position, and the driver 12 is protected by inhibiting movement of the knee 14. The passenger restraint apparatus S is arranged in a lower side of a steering column 18 corresponding to a vehicle front side of the driver.

In the following description, vertical, longitudinal and lateral relations are based on a state in which the passenger restraint apparatus is mounted on the vehicle, and coincide with vertical, longitudinal and lateral relations of the vehicle with the apparatus mounted.

The steering column 18 is provided with a main shaft 22 connected to a steering wheel 20, a column tube 24 surrounding a periphery of the main shaft 22, and a column cover 26 covering the column tube 24. The column cover 26 is arranged so as to protrude to an obliquely upper side from an instrument panel 28.

Further, the passenger restraint body S is arranged in an opening portion 30 of the instrument panel 28 so as to close the opening portion 30, and is provided with a laterally long rectangular restraint panel 32 having a length capable of restraining right and left knees of the passenger, and a drive mechanism 34 protruding the restraint panel 32 to a front side at a time when a shock load is applied to the vehicle. The drive mechanism (an actuator) 34 is provided with a pair of cylinders 36, and respective leading ends of a piston rod 38 of the cylinder 36 are connected to right and left sides of a back surface of the restraint panel 32. The actuator 34 protrudes each of the restraint panels 32 to the front side in accordance with an actuation of an inflator (not shown) on the basis of a signal output from a detection means installed in the vehicle body or the like so as to keep the passenger under restraint, at a time when the shock load is applied to the vehicle.

In this case, the instrument panel opening portion 30 is formed so as to be provided with a step receiving portion by an upper panel 28a and a lower panel 28b forming the instrument panel 28, and the laterally long rectangular plate-shaped restraint panel 32 is fitted and set to the step receiving portion 30a.

In the passenger protecting apparatus mentioned above, a shock absorbing body 40 in accordance with the present embodiment is arranged in the back surface of the restraint panel 32.

Figure 2:
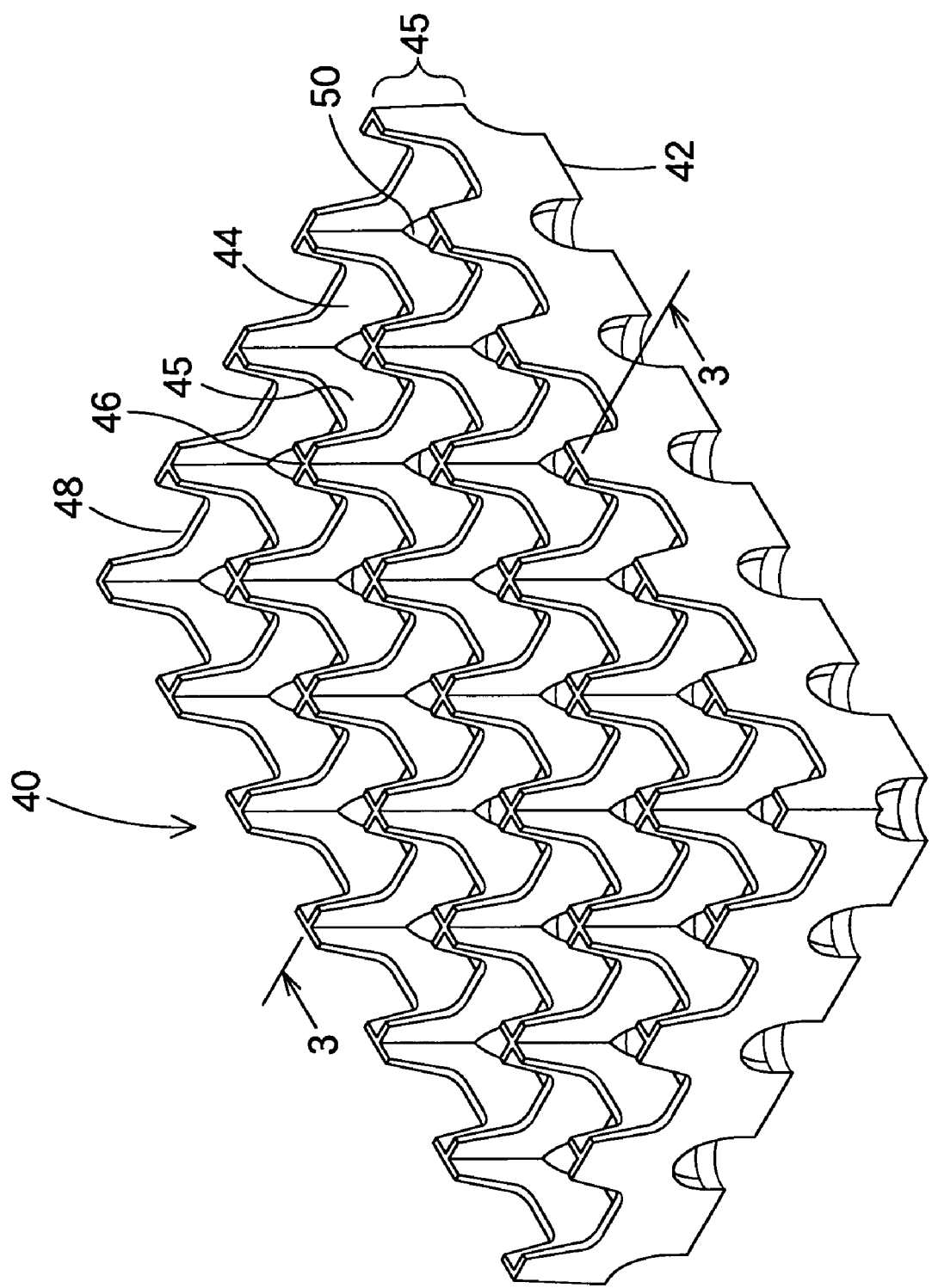
FIG. 2 is a perspective view showing one example of the shock absorbing body.
Figure 3:
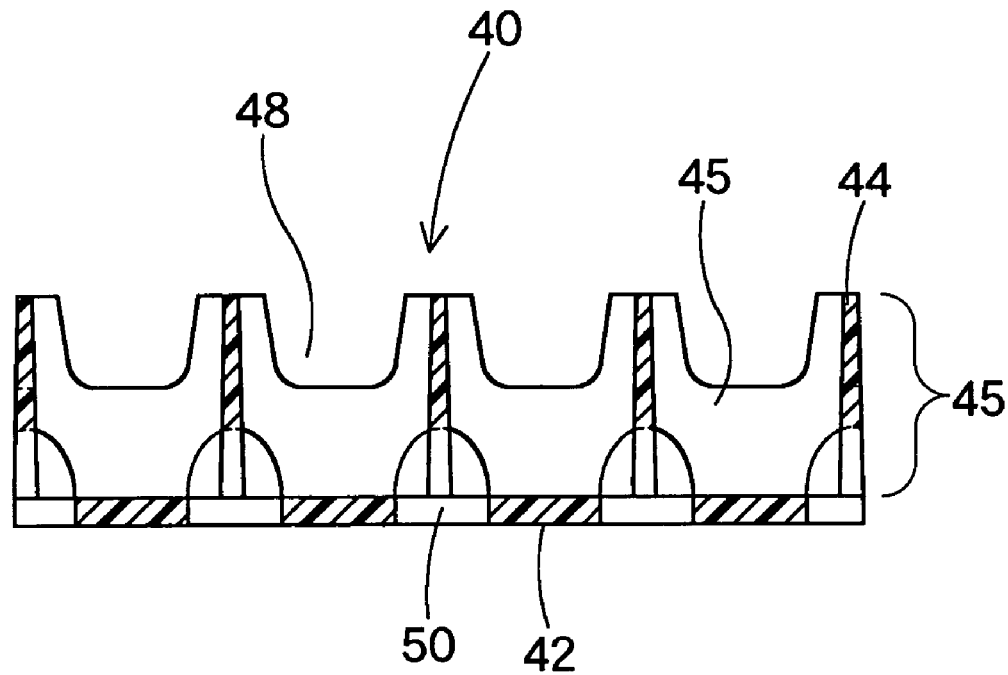
FIG. 3 is a cross sectional view along a line 3—3 in FIG. 2.
Figure 4:
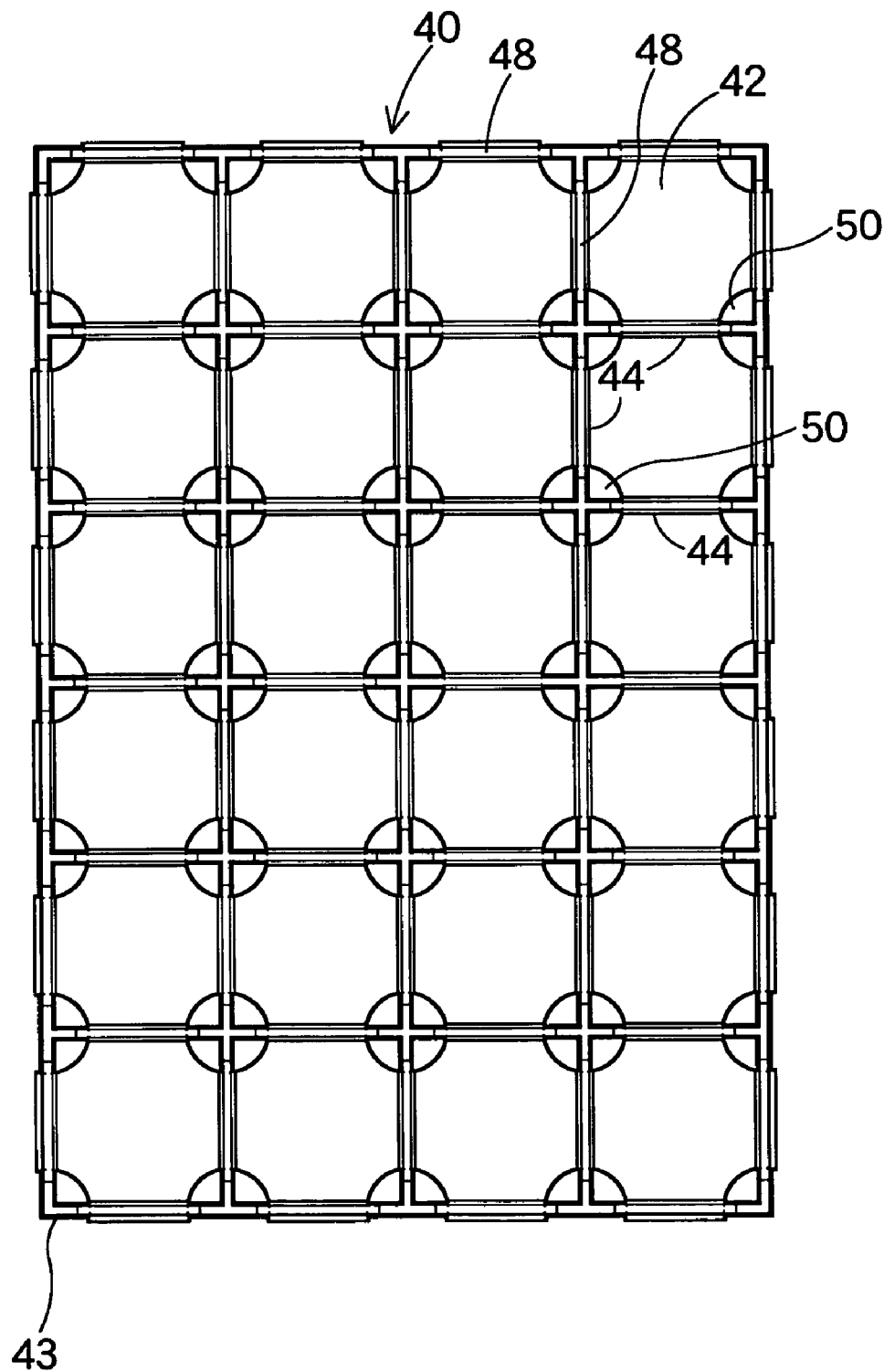
FIG. 4 is a plan view of FIG. 2.
Figure 5A:
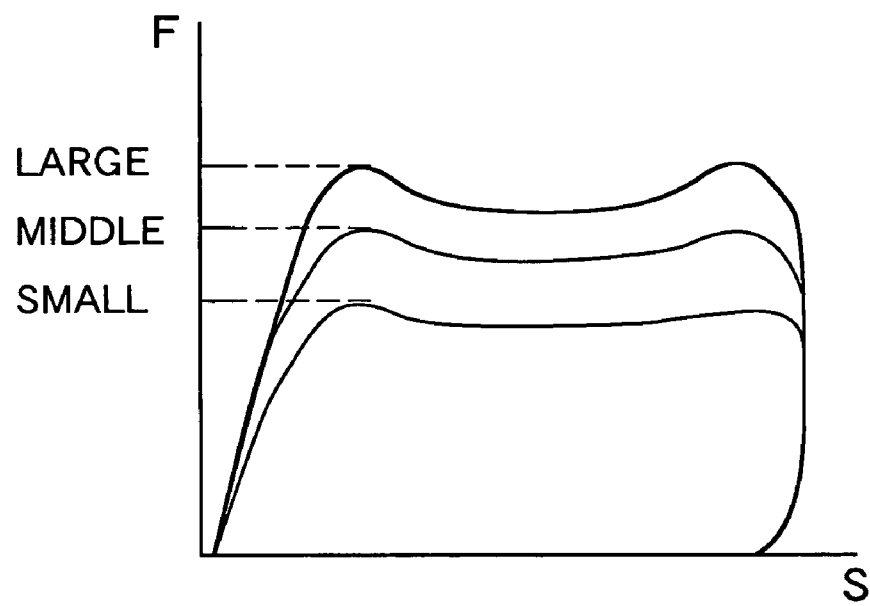
FIGS. 5A and 5B are F-S curves in accordance with the present invention and the prior art, respectively.
Figure 5B:
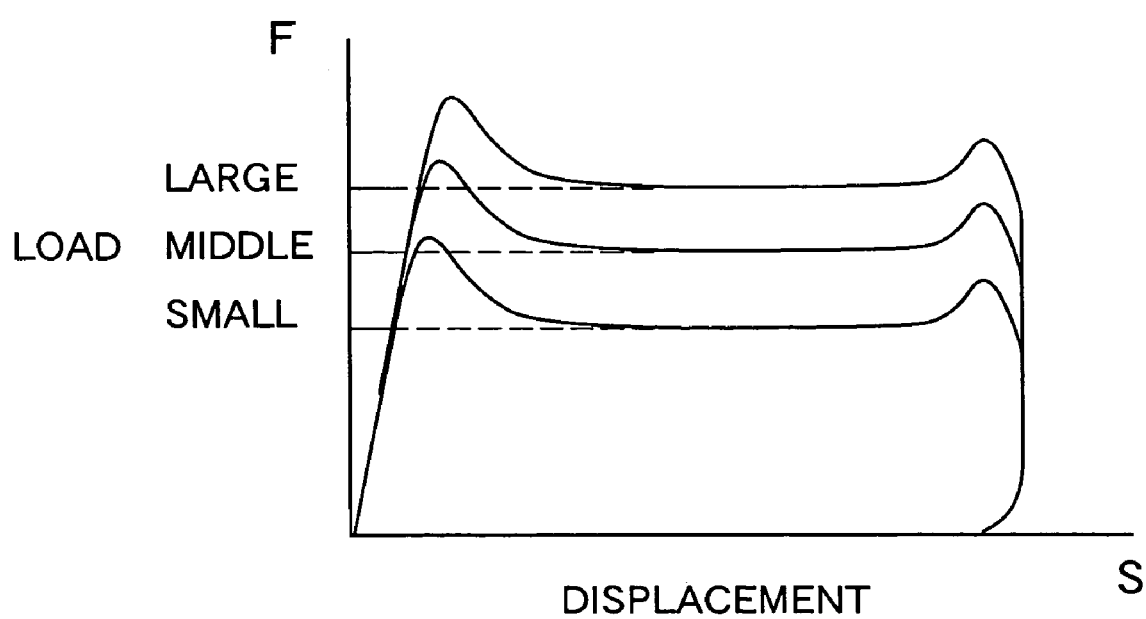

A basic structure of the shock absorbing body 40 is provided with a support plate portion 40, and a grid-like shock absorbing portion 46 formed by a plurality of thin ribs 44 and 44 on the support plate portion 40, as shown in FIGS. 2 to 4, and is normally made of a synthetic resin integrally formed by a synthetic resin material (a plastic material) in accordance with an injection molding or the like.

In the present embodiment, plane sizes of the support plate portion 40 and the shock absorbing portion 46 are the same, however, the structure may be made such that only the support plate portion 40 is enlarged, and a flange portion or the like is provided. Further, the structure may be made such that both ends of the thin rib are not provided with a connection wall in place of the structure in which the grid-like thin ribs 44 and 44 are arranged in an inner portion of a rectangular box body 43.

Further, in the present embodiment, a leading end side notch 48 and a root side notch 50 are formed at different positions, that is, at a non-grid crossing point portion and a grid crossing point portion, respectively, however, they may be formed both at the non-grid crossing point portion or the grid crossing point portion. Further, the root side notch 50 is formed only in the thin rib, and no notch (hole) may be formed in the support plate portion 42.

In this case, the leading end side notch 48 and the root side notch 50 are formed at the different positions, that is, the non-grid crossing point portion and the grid crossing point portion, for the reason of preventing a shock load from being concentrated.

In this case, in an illustrated example, the rectangular (including a square) grid is formed in an inner portion of a closed-end rectangular box body by the vertical and horizontal thin ribs 44 and 44. In this case, a draft angle of 1 to 3 degree is, of course, formed in the thin ribs 44 and 44. The horizontal cross section change caused by the draft angle hardly contributes to inhibition of a point of the initial load from being generated in the F-S curve.

In this case, the grid shape is not limited to the rectangular shape as the illustrated example, but may be constituted by a triangular shape, a regular polygonal shape (pentagonal shape and hexagonal shape) and the like, and further a parallelogram shape, a rhombic shape or the like. Further, the rising aspect of the thin rib may be constituted by an obliquely rising (10 to 20 degree) in addition to the perpendicularly rising on the support plate portion.

Further, the height and the thickness of the thin rib are different in correspondence with the forming synthetic resin material and the required shock absorbing property. In general, the height and the thickness are appropriately set within a range between 10 and 60 mm and within a range between 0.6 and 1.2 mm, respectively. For example, the height of the thin rib is set to 50 mm, the leading end is set to 1.2 mm, and the root portion is set to 2 mm.

Further, a crossing point pitch of the grids of the thin ribs 44 and 44 is appropriately set in a range between 10 and 50 mm, in general. A magnitude of the plane of the shock absorbing portion 7 is set to be capable of sufficiently receiving the knee, for example, in the case that a pair of shock absorbing portion are provided in correspondence with the right and left knees, a vertical size is set to 50 to 300 mm, and a lateral size is set to 50 to 300 mm.

If the thickness of the rib is too thick, and the grid pitch is too short, the shock absorbing portion constituted by the grid-shaped rib is hard to be plastically deformed, and the shock load value tends to become high. Further, if the thickness of the rib is too thin, and the grid pitch is too wide, the shock absorbing portion is plastically deformed too easily, and a shock energy absorbing effect is lowered.

In this case, the thickness of the support plate portion 42 is differentiated in correspondence with the kind of the synthetic resin material, and the mounting aspect of the shock absorbing body 40 to the vehicle, however, is generally set to 2 to 3 mm.

In this case, in accordance with the present embodiment, the parallel cross sectional areas of the shock load applied surfaces in the initial receiving portion and the terminal receiving portion for the shock load are made small, by forming the notch (the leading end side notch) 48 between the grid crossing portions (the grid crossing points) 46 of the thin ribs 44 and 44 the non-grid crossing portion) from the leading end side, and forming the notch (the root side notch) 50 in the grid crossing portions of the thin ribs 44 and 44 from the root side so as to include the support plate portion.

In this case, the notch shape of the leading end side notch 48 is formed in an arch shape in the illustrated example, however, may be formed in a triangular shape, a trapezoidal shape, a semicircular shape or the like. Further, the shape of the root side notch 50 corresponds to a shape notched by rotating a parabola around a perpendicular line passing through the grid crossing point 46, however, may be constituted by a shape notched by rotating an isosceles triangle and a semicircle.

In the structure mentioned above, the leading end side notch 48 is formed on all the wall surfaces formed between the grid crossing points, and the root side notch 50 is formed in all the grid crossing points, however, may be formed only in the vertical ribs or the lateral ribs or alternately in correspondence with the aspect of the shock load to be absorbed.

A notch rate of the leading end side notch 48 with respect to each of the rib wall surfaces is differentiated in correspondence with the required load (F)—displacement (S) curve, however, is appropriately set in a range between 5 and 50%, in general. The notch height is set between $1/10$ and $8/10$ of the rib height.

For example, as shown in FIG. 4A, the load adjustment and the energy absorption amount adjustment can be carried out by adjusting the notch amount (the notch ratio) corresponding to the design factor of the leading end side notch 48 and the root side notch 50 in correspondence with the required shock energy absorption amount and the average load (resistance) (for example, large, middle and small).

The shock absorbing body having the structure mentioned above is generally manufactured by means of an injection molding so as to include the vertical notches, however, the leading end side and root side notches may be formed by forming the grid-like box bodies in a lump and applying a machining work by a lathe turning machine or the like to the formed body. In this case, the shock absorbing bodies having different energy absorption amounts and stress load values can be manufactured by the same formed body.

The synthetic resin is not particularly limited, however, a polyolefine group such as a polypropylene (PP), a polyethylene (PE), a polymer alloy and the like is preferable because they tend to be plastically deformed (ductile) and are small in weight. Among them, the material having an elastic modulus in bending of 9800 MPa or less is generally used.

Next, the shock absorbing body 40 having the structure mentioned above is mounted to right and left sides of the back surface of the restraint panel (generally having the same specification as that of the instrument panel interior member) 32 mentioned above. The mounting means is not particularly limited to an adhesive agent, a welding and the like. For example, it is integrated by an ultrasonic welding so as to be mounted. At this time, the restraint panel 32 is directly mounted to a pressing plate 39 mounted to a leading end of the cylinder 36 corresponding to the constituting part of the actuator 34, in the illustrated example. In this case, the pressing plate 39 may be structured such that a gap is formed between the pressing plate 39 and the restraint panel 32, and the restraint panel 32 integrally forming the shock absorbing body 40 can be mounted to an independently provided holding member by a clip or the like.

In this case, the pressing plate 39 is constituted by a hard synthetic resin plate or a metal plate.

When the shock is applied to the vehicle, a sensor built in a bumper or the like detects the shock, and the inflator is operated. The restraint panel integrally formed in the shock absorbing body by the pressing plate 39 is protruded to the front side on the basis of the operation of the inflator, and puts the knee 14 of the passenger under restraint. At this time, there is a case that the knee and the restraint panel 32 are interfered with each other, and the knee 14 eats into the shock absorbing body 40 via the restraint panel 32.

At this time, the point of the initial load in the F-S curve is inhibited on the basis of the existence of the leading end notch 48 of the shock absorbing body 40. Further, the generation of the amount of the portion which is not collapsed is less even if the buckling deformation reaches the portion near the rib root, on the basis of the existence of the root side notch of the shock absorbing body 40, so that the point of the terminal load in the F-S curve is inhibited. Further, the stroke amount is relatively increased, it is possible to improve an energy absorption efficiency of the shock energy absorbing body, and it is possible to make the shock absorbing body thin (small) consequently.

What is claimed is:

1. A vehicular shock absorbing body used for absorbing a shock in a vehicle and made of a synthetic resin, comprising:
   a support plate portion; and
   a shock absorbing portion formed in a grid shape on said support plate portion by a plurality of thin ribs, and plastically deforming at a time of applying a shock load so as to be absorbable a shock energy,
   wherein an entire cross sectional area of each of a leading end portion corresponding to a shock absorbing initial portion and a root portion corresponding to a shock absorbing terminal portion, in said thin ribs is made smaller than an intermediate portion, and a load point is inhibited from being generated at an initial stage and a terminal stage in load (F)—displacement amount (S).

2. A vehicular shock absorbing body as claimed in claim 1, wherein a notch is formed between grid crossing points in said thin rib from a leading end side, and a notch is formed from a root side of the grid crossing points so as to include said support plate portion, thereby inhibiting the load point from being generated at the initial stage and the terminal stage in the load (F)—displacement amount (S).

3. A vehicular shock absorbing body as claimed in claim 1 or 2, wherein said grid shape is constituted by a rectangular shape.

4. A vehicular interior member comprising a protection predetermined portion with respect to a passenger, wherein the vehicular shock absorbing body as claimed in claims 1 or 2 is arranged in a back surface of the protection predetermined portion of said vehicular interior member.

5. A vehicular interior member as claimed in claim 4, wherein said protection predetermined portion is constituted by a restrain panel protruding to the passenger side at a time of applying a shock load so as to restrain and protect a knee of the passenger.

* * * * *